(12) United States Patent
Dicristofano et al.

(10) Patent No.: US 10,974,908 B2
(45) Date of Patent: Apr. 13, 2021

(54) METHODS AND SYSTEMS FOR CONTROLLING A VIBRATORY FEEDER

(71) Applicant: SPIROL INTERNATIONAL CORPORATION, Danielson, CT (US)

(72) Inventors: Louis Dicristofano, Johnston, RI (US); Russell Radant, Central Village, CT (US)

(73) Assignee: Spirol International Corporation, Danielson, CT (US)

(*) Notice: Subject to any disclaimer, the term of this patent is extended or adjusted under 35 U.S.C. 154(b) by 0 days.

(21) Appl. No.: 16/065,345

(22) PCT Filed: Sep. 12, 2017

(86) PCT No.: PCT/US2017/051064
§ 371 (c)(1),
(2) Date: Jun. 22, 2018

(87) PCT Pub. No.: WO2019/054983
PCT Pub. Date: Mar. 21, 2019

(65) Prior Publication Data
US 2020/0002100 A1    Jan. 2, 2020

Related U.S. Application Data

(60) Provisional application No. 62/557,184, filed on Sep. 12, 2017.

(51) Int. Cl.
*B65G 27/10* (2006.01)
*B65G 27/00* (2006.01)
(Continued)

(52) U.S. Cl.
CPC ............. *B65G 47/14* (2013.01); *B65G 27/08* (2013.01); *B65G 27/32* (2013.01); *G01G 13/08* (2013.01)

(58) Field of Classification Search
None
See application file for complete search history.

(56) References Cited

U.S. PATENT DOCUMENTS 3,803,556 A * 4/1974 Duffy .................... B65G 47/50
                                            700/226
5,639,995 A    6/1997 Mosher
(Continued)

OTHER PUBLICATIONS

International Search Report and the Written Opinion of the International Searching Authority, International Application No. PCT/US2017/051064, dated Dec. 15, 2017.

*Primary Examiner* — Kavel Singh
(74) *Attorney, Agent, or Firm* — Murtha Cullina LLP; Anthony P. Gangemi

(57) ABSTRACT

Methods and systems for controlling a vibratory feeder are disclosed. In some embodiments, the methods and systems include the following: a controller module including a graphical user interface for selecting operating parameters to be communicated to a bowl drive that causes a feeder bowl to move, monitoring algorithms stored in non-transitory memory for processing motion data to monitor motion of the feeder bowl, and adjustment algorithms stored in non-transitory memory for determining and automatically adjusting the operating parameters, and a motion sensor module configured to mount with and sense motion of the bowl drive, the motion sensor module including an accelerometer, a digital signal processor (DSP) microcontroller, and a transmitter. The DSP microcontroller samples output data from the accelerometer, determines motion data of the motion of the bowl drive, and transmits the motion data via the transmitter to the controller module.

20 Claims, 5 Drawing Sheets

(51) Int. Cl.
*B65G 27/32* (2006.01)
*B65G 47/14* (2006.01)
*B65G 27/08* (2006.01)
*G01G 13/08* (2006.01)

(56) References Cited

U.S. PATENT DOCUMENTS

| | | | | |
|---|---|---|---|---|
| 5,804,733 | A * | 9/1998 | Kurita | B06B 1/0246 |
| | | | | 73/664 |
| 5,883,478 | A * | 3/1999 | Thesling | H02P 25/032 |
| | | | | 198/762 |
| 6,260,691 | B1 | 7/2001 | Buchas | |
| 7,740,130 | B2 * | 6/2010 | Wallace | B65G 43/02 |
| | | | | 198/810.02 |
| 8,757,363 | B2 * | 6/2014 | Combs | B65G 43/10 |
| | | | | 198/781.01 |
| 9,022,063 | B2 | 5/2015 | Powell | |
| 2002/0105772 | A1 | 8/2002 | Yagi | |
| 2003/0205413 | A1 | 11/2003 | Gesuita et al. | |
| 2004/0007445 | A1 | 1/2004 | Demarest et al. | |
| 2004/0148056 | A1 | 7/2004 | Baranowski | |
| 2010/0063629 | A1 | 3/2010 | Battisti et al. | |
| 2011/0204083 | A1 | 8/2011 | Meckstroth | |
| 2011/0301747 | A1 | 12/2011 | Chambers | |
| 2014/0233343 | A1 | 8/2014 | Reilley et al. | |
| 2015/0081110 | A1 | 3/2015 | Houston et al. | |

* cited by examiner

METHODS AND SYSTEMS FOR CONTROLLING A VIBRATORY FEEDER

CROSS REFERENCE TO RELATED APPLICATION(S)

This application is a national stage filing of International Patent Application No. PCT/US2017/051064, filed Sep. 12, 2017, which claims the benefit of U.S. Provisional Application No. 62/557,184, filed Sep. 12, 2017, which is incorporated by reference as if disclosed herein in its entirety.

BACKGROUND

Vibratory feeder systems are used extensively in industry to feed and orient component parts to assembly or production lines. Systems are usually manufactured to feed a certain component. The feeder directly affects production output.

In traditional feeder systems, when a different component is fed, the feeder bowl is usually changed and/or tooling on the bowl is adjusted to feed the new part. In either case, the settings for the vibratory controller will need to be changed and inputted manually every time a changeover is done, increasing downtime. These feeder system also use an analog accelerometer on the drive and feed a sinusoidal analog signal back to a controller regarding bowl load conditions and/or drive spring relaxation. However, this configuration tends to result in decreased performance due to noise and crosstalk which degrade the integrity of the signal before reaching the controller. The determination of the natural frequency is important to the proper function of the drive. The natural resonant frequency does change as the bowl moves so that reading an initial pulse feedback is not accurate enough.

Finally, access to feeder system settings in traditional systems tends to be difficult. Further, adjustment of controller settings while watching parts feed in the bowl is advantageous, however often difficult in traditional system.

SUMMARY

The system of the present disclosure is the ultimate in feeder technology. In some embodiments, the microprocessor based controller has a 7 inch touchscreen display. In some embodiments, the system includes a 50 recipe storage capacity. In some embodiments, the system includes an Ethernet interface. In some embodiments, a feedback circuit optimizes feeding by adjusting power and frequency to maintain constant vibration amplitude.

In some embodiments, the controller monitors the frequency of the feeder system and continuously adjusts the output drive frequency to match the natural resonant frequency. The control system also automatically adjusts the power level and synchronizes it with the spring packs to achieve maximum efficiency.

In some embodiments, the drive is comprised of two independent banks of springs, horizontal and vertical. In some embodiments, the springs are fixed and do not need adjustment. In some embodiments, the vertical springs are configured to ensure the vertical component of the vibration provides a natural frequency which is less than the horizontal frequency. This ensures the horizontal springs do not affect the movement of the vertical springs through sympathetic vibration.

In some embodiments, the system is designed to operate independently of power/line frequency (in U.S.A. 60 Hertz).

In some embodiments, the mechanical design of the drive unit allows operating frequencies of 20-60 Hz.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
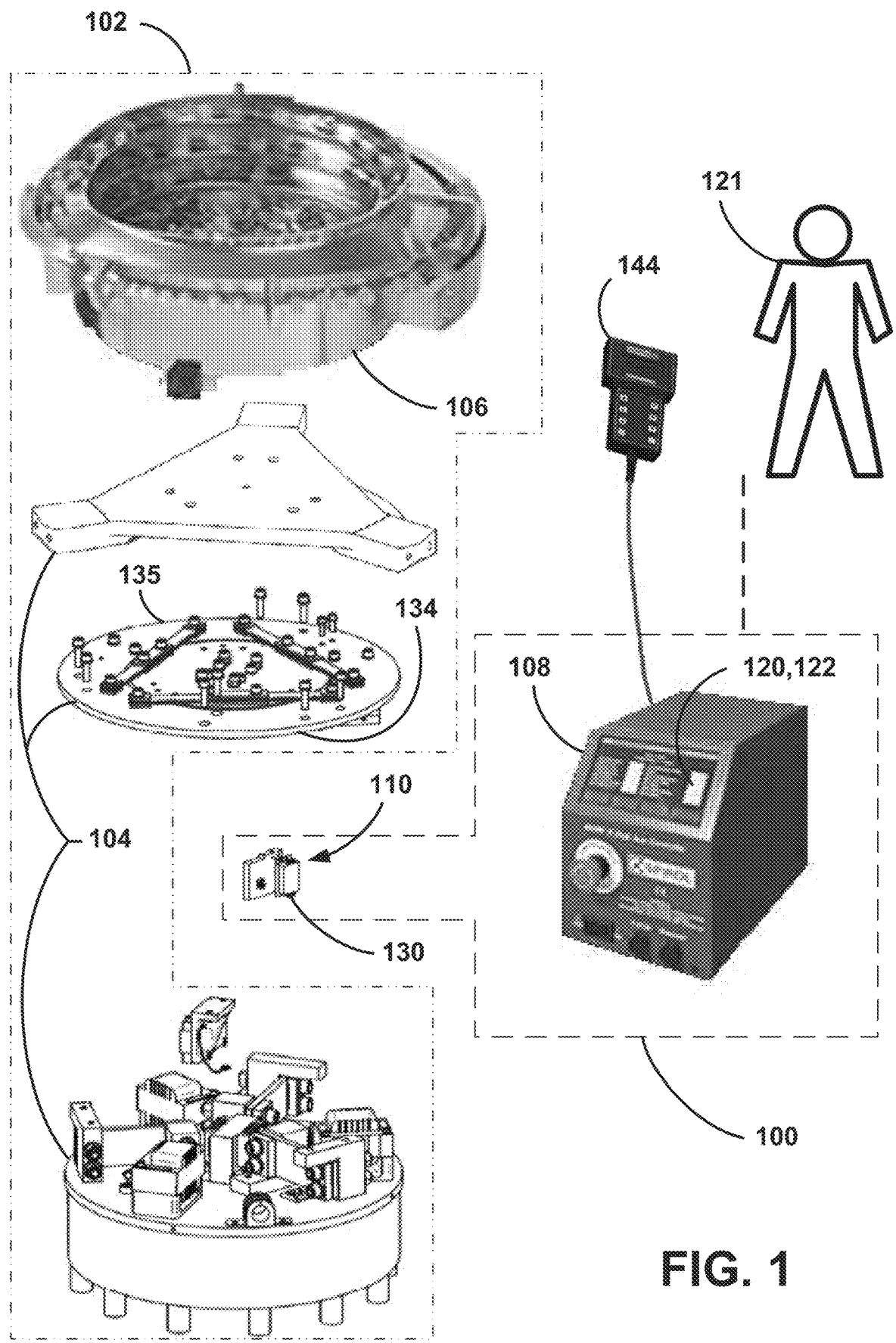
FIG. 1 is a schematic diagram of methods and systems according to some embodiments of the disclosed subject matter.
Figure 2:
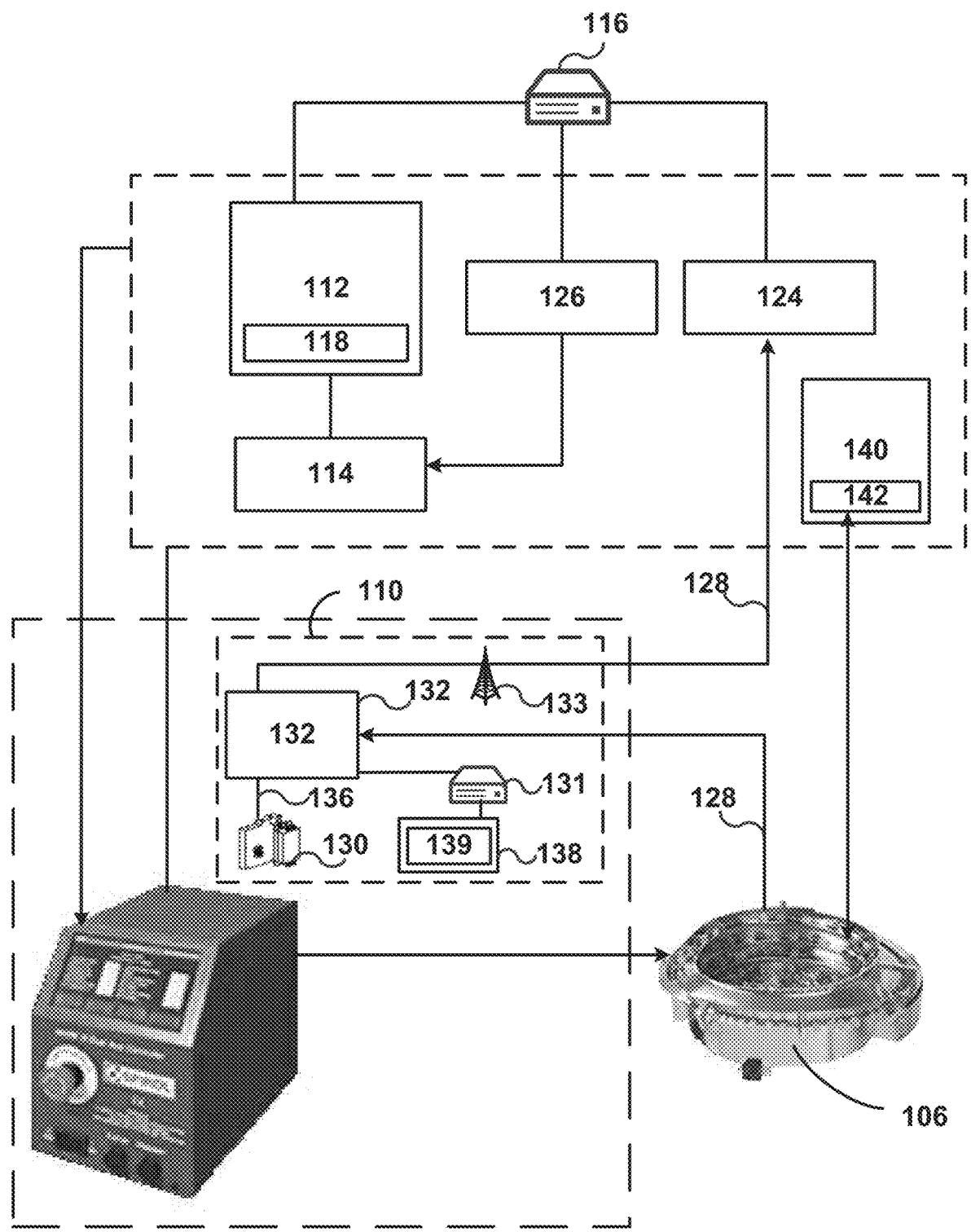
FIG. 2 is a schematic diagram of methods and systems according to some embodiments of the disclosed subject matter.

Referring now to FIGS. 1 and 2, some embodiments of the disclosed subject matter include a control system 100 for a vibratory feeder 102 having a bowl drive 104 that drives a feeder bowl 106. Control system 100 includes a controller module 108 that communicates with a motion sensor module 110 to ensure consistent operation of vibratory feeder 102 and bowl drive 104.

Controller module 108 includes an operating parameter sub-module 112 for creating and or selecting application-specific sets of operating parameters 114 for bowl drive 104 and non-transitory memory 116 for storing the application-specific sets of operating parameters created in the operating parameter sub-module. In some embodiments, operating parameters 114 for bowl drive 106 include horizontal power, horizontal frequency, vertical power, vertical frequency, and phase. In some embodiments, the application-specific sets of operating parameters 114 include both parameters for operating bowl drive 104 in both forward and reverse directions. In some embodiments, operating parameter sub-module 112 includes default operating parameters 118 stored in non-transitory memory 116.

Controller module 108 includes a graphical user interface 120, which allows a user 121 to select default operating parameters 118 and/or manually enter operating parameters 114 to be communicated to bowl drive 104, thereby causing feeder bowl 106 to move in one or more directions according to the selected/entered operating parameters. Graphical user interface 120 includes an LCD touch screen 122, or similar. In some embodiments, controller module 108 is configured to have a default power step size of about 1% and manually entered power step sizes from about 0.1% to about 1% in about 0.1% increments and a default frequency step size of about 0.1 Hz and manually entered frequency step sizes from about 0.01 Hz to about 0.1 Hz in about 0.01 Hz increments. Also, there the graphical user interface allows storing and recall of up to 50 setup (recipes) of operating parameters.

Controller module 108 includes monitoring algorithms 124 and adjustment algorithms 126, both of which are stored in non-transitory memory 116. Monitoring algorithms 124 process motion data 128 to monitor motion of feeder bowl 106 and adjustment algorithms 126 determine and automatically adjust operating parameters 114 so the overall performance of feeder bowl 106 meets predetermined performance standards. In some embodiments, operating parameters 114 will be automatically adjusted so as to be substantially similar to the selected/entered operating parameters. In some embodiments, operating parameters 114 will be automatically adjusted so that feeder bowl 106 is balanced and parts delivered by the feeder bowl are delivered at a desired rate and desired spacing, etc.

Motion sensor module 110 includes an accelerometer 130, non-transitory memory 131, a digital signal processor (DSP) microcontroller 132, and a transmitter 133. Motion sensor module 110 is mounted on a bottom surface 134 of a top plate 135 of bowl drive 104 to accurately sense the motion of the bowl drive. In operation, DSP microcontroller 132 samples output data 136 from accelerometer 130, and determines motion data 128 corresponding to the motion of bowl drive 104, e.g., amplitude and resonant frequency data, etc., related to movement of the bowl drive in x, y, and z directions. DSP microcontroller includes a software program 138 having a fast Fourier transform 139 to allow rapid performance of calculations. Software program 138 is stored in non-transitory memory 131. DSP microcontroller 132 transmits motion data 128 via transmitter 133 to controller module 108.

In some embodiments, controller module 108 includes a bowl drive coil module 140 that includes coil sensors 142 for dynamically measuring bowl drive coil voltages and currents. In some embodiments, bowl drive coil module 140 also includes mechanisms (not shown) for determining whether particular coils are present and in working order and mechanisms (not shown) for disabling communication to unused or defective coils.

In some embodiments, control system 100 includes a handheld remote control 144 for controlling controller module 108. Handheld remote control 144 is in communication with controller module 108 via wired or wireless communications.

In some embodiments, controller module 108 includes hardware (not shown) for connecting it to the Internet. In some embodiments, the hardware connects to the Internet via wired or wireless technology and content displayed on graphical user interface 120 is substantially mirrored on a screen 145 of a device 146 that accesses the content via the Internet.

In some embodiments, controller module 108 includes a universal serial bus interface 148 for connecting the controller module to computer devices 150.

Figure 3A:
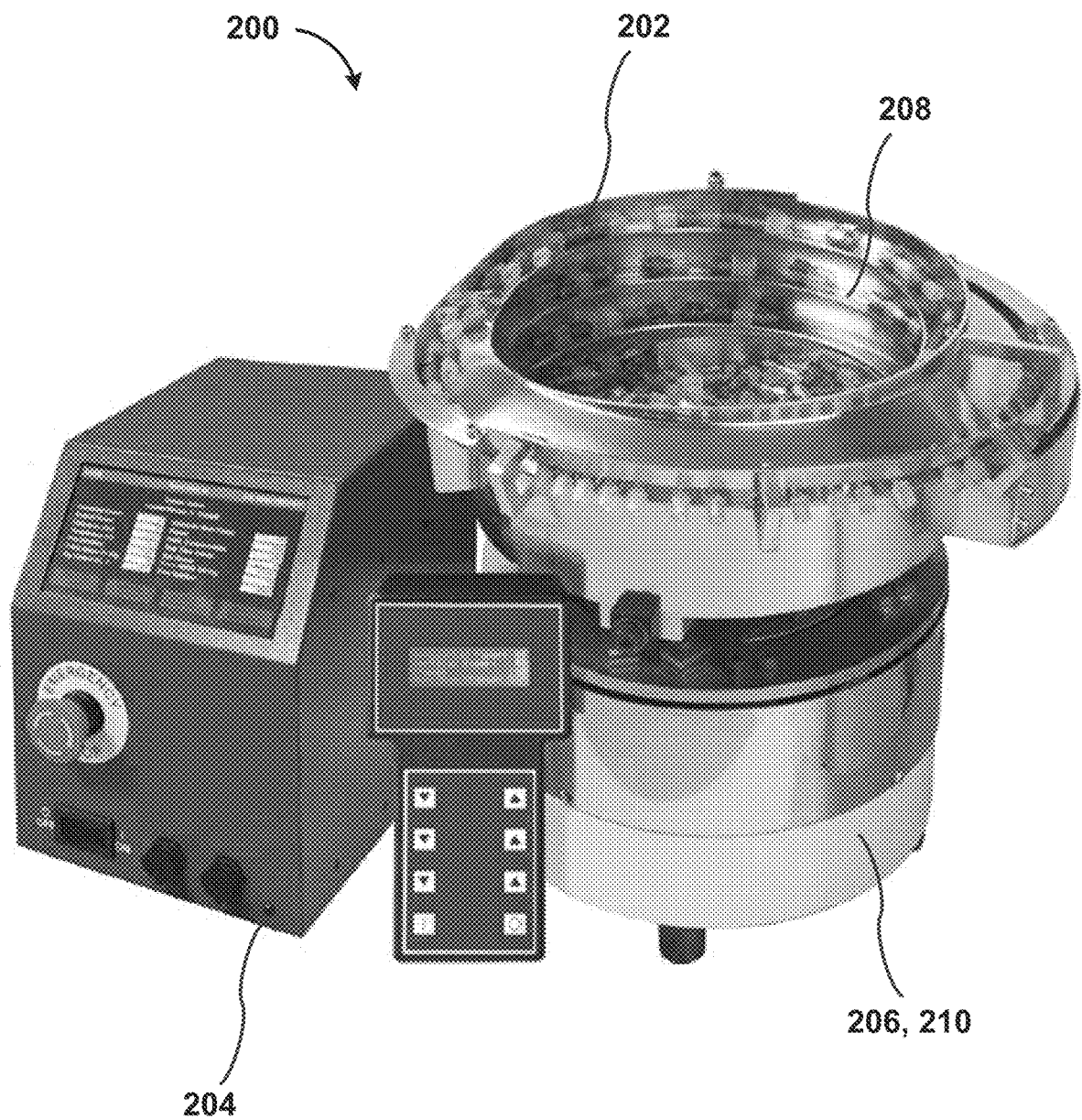
FIGS. 3A and 3B is a schematic diagram of methods and systems according to some embodiments of the disclosed subject matter.
Figure 3B:
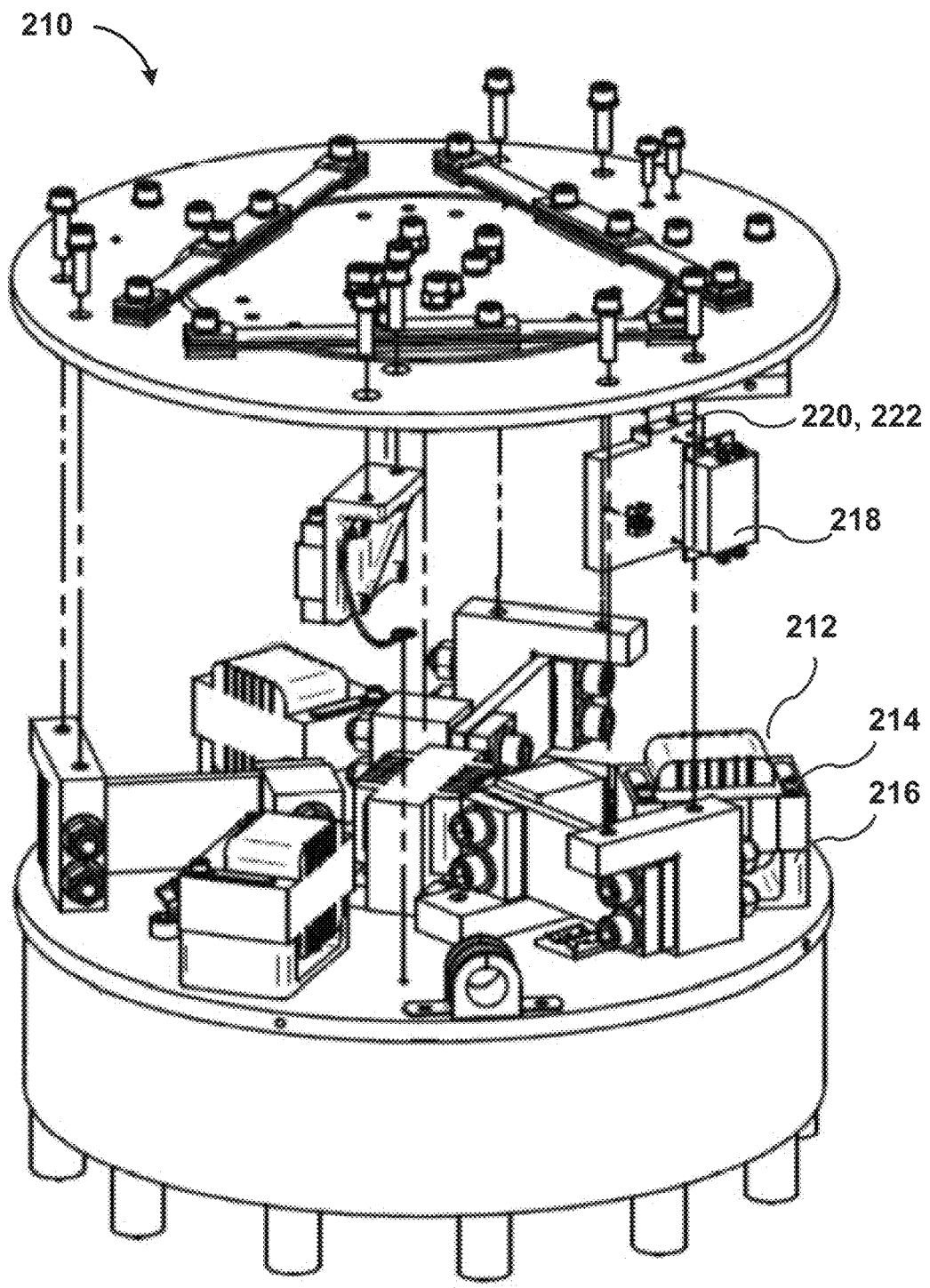

Referring now to FIGS. 3A and 3B, some embodiments of the disclosed subject matter are directed to a vibratory feeder system 200, which includes a vibratory feeder 202, a controller module 204, and a motion sensor module 206, all of which are in communication with one another.

Vibratory feeder 202 includes a feeder bowl 208 and a bowl drive 210. In some embodiments, vibratory feeder system 200 includes a bowl drive coil module 212, which has sensors 214 for dynamically measuring voltages and currents of bowl drive coils 216, mechanisms for determining whether particular coils are present and in working order, and mechanisms for disabling communication to unused or defective coils.

Controller module 204 is used for selecting operating parameters (not shown) to be communicated to bowl drive 210. The operating parameters cause feeder bowl 208 to move. Controller module 204 also interacts with motion sensor module 206 and bowl drive coil module 212 to monitor motion of the feeder bowl and automatically adjusts the operating parameters so as to be substantially similar to the originally selected/desired operating parameters.

Motion sensor module 206 is mounted to bowl drive 210 and includes an accelerometer 218, a digital signal processor (DSP) microcontroller 220, and a transmitter 222. In use, DSP microcontroller 220 samples output data from accelerometer 218, determines motion data of bowl drive 210, and transmits the motion data via transmitter 222 to controller module 204.

Figure 4:
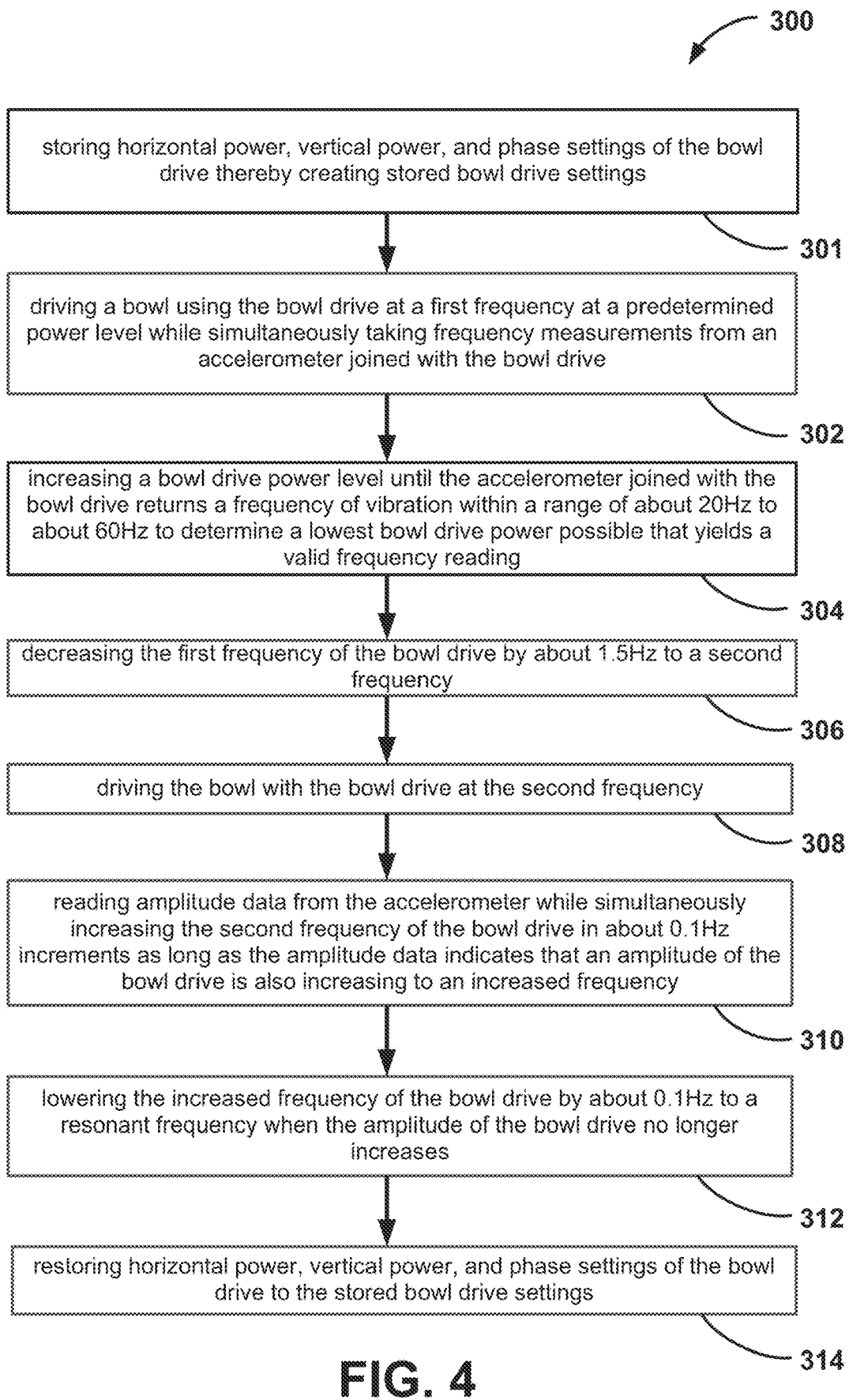
FIG. 4 is a chart of a method according to some embodiments of the disclosed subject matter.

Referring now to FIG. 4, some embodiments of the disclosed subject matter include a method 300 for calibrating resonant frequency of a bowl drive of a vibratory feed system. At 301, the initial horizontal power, vertical power, and phase settings of the bowl drive are stored in at least temporary memory thereby creating stored bowl drive settings. At 302, the bowl drive drives the bowl at a first frequency at a predetermined power level while simultaneously taking frequency measurements from an accelerometer joined with the bowl drive. At 304, the bowl drive power level is increased until the accelerometer joined with the bowl drive returns a frequency of vibration within a range of about 20 Hz to about 60 Hz to determine a lowest bowl drive power possible that yields a valid frequency reading. At 306, the frequency of the bowl drive is decreased from the first frequency by about 0.5 Hz to a second frequency. In some embodiments, the frequency of the bowl drive is decreased from the first frequency by about 1.5 Hz to a second frequency. At 308, the bowl is driven by the bowl drive at the second frequency. At 310, amplitude data from the accelerometer is read while simultaneously increasing the second frequency of the bowl drive in about 0.1 Hz increments as long as the amplitude data indicates that an amplitude of the bowl drive is also increasing to an increased frequency. At 312, when the amplitude of the bowl drive no longer increases, the increased frequency of the bowl drive is lowered by about 0.1 Hz to a resonant frequency. In some embodiments, after the resonant frequency is determined, at 314, the horizontal power, vertical power, and phase settings of the bowl drive are restored to the stored bowl drive settings.

Systems consistent with some embodiments of the present disclosure advantageously include a controller which would allow the storage and retrieval of setups (recipes). Further, unlike systems consistent with some embodiments of the present disclosure, those prior systems do not have the ability to change horizontal, vertical and phase relationships, which allow multiple setups on one drive. Thus, the systems of the present disclosure eliminate the need to swap or physically reconfigure feeder bowls to accommodate feeding of different products. This reduces the operational complexity for the user and allows for faster transitions from the feeding of one product to the feeding of a different product. In some embodiments, the present disclosure includes an Ethernet camera to view the system.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A control system for a vibratory feeder comprising:
   a controller module including a graphical user interface for selecting operating parameters to be communicated to a bowl drive that causes a feeder bowl to move, monitoring algorithms stored in non-transitory memory for processing motion data to monitor motion of said feeder bowl, and adjustment algorithms stored in non-transitory memory for determining and automatically adjusting said operating parameters, an operating parameter sub-module for creating application-specific sets of operating parameters including horizontal power, horizontal frequency, vertical power, vertical frequency, and phase, and non-transitory memory for storing said application-specific sets of operating parameters created in said operating parameter sub-module; and a motion sensor module configured to mount with and sense motion of said bowl drive, said motion sensor module including an accelerometer, a digital signal processor (DSP) microcontroller, and a transmitter;

wherein said DSP microcontroller samples output data from said accelerometer, determines motion data of said motion of said bowl drive, and transmits said motion data via said transmitter to said controller module;

wherein said motion data includes data related to movement of said bowl drive in x, y, and z directions;

wherein said application-specific sets of operating parameters include both parameters for operating said bowl drive in both forward and reverse directions.

2. The control system for claim 1, wherein said motion data includes amplitude and resonant frequency data.

3. The control system for claim 1, wherein said operating parameter sub-module includes default operating parameters stored in said non-transitory memory.

4. The control system for claim 1, wherein said controller module is configured to have a default power step size of about 1% and manually entered power step sizes from about 0.1% to about 1% in about 0.1% increments.

5. The control system for claim 1, wherein said controller module is configured to have a default frequency step size of about 0.1 Hz and manually entered frequency step sizes from about 0.01 Hz to about 0.1 Hz in about 0.01 Hz increments.

6. The control system for claim 1, wherein said graphical user interface of said controller module includes an LCD touch screen.

7. The control system for claim 1, wherein said DSP microcontroller includes a software program having a fast Fourier transform, said software program stored in non-transitory memory.

8. The control system for claim 1, said controller module further comprising:
a bowl drive coil module including sensors for dynamically measuring bowl drive coil voltages and currents, mechanisms for determining whether particular coils are present and in working order, and mechanisms for disabling communication to unused or defective coils.

9. The control system for claim 1, further comprising a handheld remote control for controlling said controller module, wherein said handheld remote control is in communication with said controller module via wired or wireless communications.

10. The control system for claim 1, wherein said controller module includes hardware for connecting it to the Internet.

11. The control system for claim 10, wherein said hardware connects to the Internet via wired or wireless technology.

12. The control system for claim 10, wherein content displayed on said graphical user interface is substantially mirrored on a screen of a device that accesses said content via the Internet.

13. The control system for claim 1, wherein said controller module further comprises a universal serial bus interface for connecting said controller module to computer devices.

14. A control system for a vibratory feeder comprising:
a controller module including a graphical user interface for selecting operating parameters to be communicated to a bowl drive that causes a feeder bowl to move, monitoring algorithms stored in non-transitory memory for processing motion data to monitor motion of said feeder bowl, adjustment algorithms stored in non-transitory memory for determining and automatically adjusting said operating parameters, an operating parameter sub-module for creating application-specific sets of operating parameters including horizontal power, horizontal frequency, vertical power, vertical frequency, and phase, and non-transitory memory for storing said application-specific sets of operating parameters created in said operating parameter sub-module; and a motion sensor module configured to mount with and sense motion of said bowl drive, said motion sensor module including an accelerometer, a digital signal processor (DSP) microcontroller, and a transmitter;

wherein said DSP microcontroller samples output data from said accelerometer, determines motion data of said motion of said bowl drive, and transmits said motion data via said transmitter to said controller module;

wherein said controller module is configured to have a default power step size of about 1% and manually entered power step sizes from about 0.1% to about 1% in about 0.1% increments.

15. The control system of claim 14, wherein said graphical user interface of said controller module includes an LCD touch screen.

16. The control system of claim 14, said controller module further comprising:
a bowl drive coil module including sensors for dynamically measuring bowl drive coil voltages and currents, mechanisms for determining whether particular coils are present and in working order, and mechanisms for disabling communication to unused or defective coils.

17. The control system of claim 14, wherein said motion data includes amplitude and resonant frequency data.

18. A control system for a vibratory feeder comprising:
a controller module including a graphical user interface for selecting operating parameters to be communicated to a bowl drive that causes a feeder bowl to move, monitoring algorithms stored in non-transitory memory for processing motion data to monitor motion of said feeder bowl, adjustment algorithms stored in non-transitory memory for determining and automatically adjusting said operating parameters, an operating parameter sub-module for creating application-specific sets of operating parameters including horizontal power, horizontal frequency, vertical power, vertical frequency, and phase, and non-transitory memory for storing said application-specific sets of operating parameters created in said operating parameter sub-module; and a motion sensor module configured to mount with and sense motion of said bowl drive, said motion sensor module including an accelerometer, a digital signal processor (DSP) microcontroller, and a transmitter;

wherein said DSP microcontroller samples output data from said accelerometer, determines motion data of said motion of said bowl drive, and transmits said motion data via said transmitter to said controller module;

wherein said controller module is configured to have a default frequency step size of about 0.1 Hz and manually entered frequency step sizes from about 0.01 Hz to about 0.1 Hz in about 0.01 Hz increments.

19. The control system of claim 18, wherein said graphical user interface of said controller module includes an LCD touch screen.

20. The control system of claim 18, said controller module further comprising:

a bowl drive coil module including sensors for dynamically measuring bowl drive coil voltages and currents, mechanisms for determining whether particular coils are present and in working order, and mechanisms for disabling communication to unused or defective coils.

* * * * *